US012341882B2

(12) United States Patent
Lamb et al.

(10) Patent No.: US 12,341,882 B2
(45) Date of Patent: Jun. 24, 2025

(54) TECHNIQUES FOR GENERATING CRYPTOGRAPHIC VALUES

(71) Applicant: SecureXperts Incorporated, Kennedy Space Center, FL (US)

(72) Inventors: William C. Lamb, Kennedy Space Center, FL (US); Darnell Washington, Kennedy Space Center, FL (US)

(73) Assignee: SECUREXPERTS INCORPORATED, Kennedy Space Center, FL (US)

( * ) Notice: Subject to any disclaimer, the term of this patent is extended or adjusted under 35 U.S.C. 154(b) by 359 days.

(21) Appl. No.: 17/654,001

(22) Filed: Mar. 8, 2022

(65) Prior Publication Data

US 2022/0286281 A1 Sep. 8, 2022

Related U.S. Application Data

(60) Provisional application No. 63/158,295, filed on Mar. 8, 2021.

(51) Int. Cl.
*H04L 9/08* (2006.01)
*H04L 9/32* (2006.01)
*H04N 23/51* (2023.01)
*H04N 23/54* (2023.01)
*H04N 23/56* (2023.01)
*H04N 23/90* (2023.01)

(52) U.S. Cl.
CPC .......... *H04L 9/0869* (2013.01); *H04L 9/3263* (2013.01); *H04N 23/51* (2023.01); *H04N 23/54* (2023.01); *H04N 23/56* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 4,850,017 A | 7/1989 | Matyas, Jr. et al. | |
| 5,363,448 A | 11/1994 | Koopman, Jr. et al. | |
| 5,732,138 A * | 3/1998 | Noll ........................ | H04L 9/001 380/46 |
| 9,485,098 B1 * | 11/2016 | Lepeshenkov .......... | G06F 21/62 |

(Continued)

FOREIGN PATENT DOCUMENTS

| | | | | |
|---|---|---|---|---|
| WO | WO-2005015986 A2 * | 2/2005 | ........... | A01K 61/002 |
| WO | WO-2021151480 A1 * | 8/2021 | ........... | H04L 9/0662 |

OTHER PUBLICATIONS

International Search Report and Written Opinion from corresponding PCT Appln. No. PCT/US2022/071030, dated May 12, 2022.

(Continued)

*Primary Examiner* — Philip J Chea
*Assistant Examiner* — James Ross Hollister
(74) *Attorney, Agent, or Firm* — Grossman, Tucker, Perreault & Pfleger PLLC (57) ABSTRACT

A system for generating cryptographic values. The system includes an imaging assembly for imaging a target member mounted on a base. A controller receives output image data from the image assembly and generates a cryptographic value in response to the output image data. In some embodiments, the target member may be formed from an organic material.

16 Claims, 5 Drawing Sheets

(56) References Cited

U.S. PATENT DOCUMENTS

| | | |
|---|---|---|
| 2003/0089776 A1 | 5/2003 | Hennick et al. |
| 2008/0130875 A1 | 6/2008 | Ahlquist |
| 2009/0262928 A1 | 10/2009 | Busari |
| 2014/0286491 A1* | 9/2014 | Atherton ............... H04L 9/0866 380/270 |
| 2016/0232439 A1* | 8/2016 | Huynh .................... H04B 5/22 |
| 2019/0122428 A1* | 4/2019 | Walker ................... G06T 17/00 |
| 2020/0364922 A1* | 11/2020 | Baker ................ H04N 1/00827 |
| 2021/0027447 A1* | 1/2021 | Parikh .................... G06F 18/22 |
| 2021/0294576 A1* | 9/2021 | Hill ........................ B01F 27/91 |

OTHER PUBLICATIONS

Teoh, et al., "Personalised Cryptographic Key Generation Based on FaceHashing", Computers & Security, 2004, 23, Melaka, Malaysia, pp. 606-614.

* cited by examiner

Scan Result

↓

◯ Verified.

NAME
SERIAL
20172898

ORIGIN
French Polynesia

LUSTRE
Medium

SHAPE
Round

SIZE
12.2mm

COLOUR
Grey Green

BLEMISH
included

IRIDESCENCE

E-CODE
30152A86284E20000133D062

PRODUCT INFO

STORY

NUCLEATION
0000-00-00

HARVEST
0000-00-00

CERTIFICATE
0000-00-00

TECHNIQUES FOR GENERATING CRYPTOGRAPHIC VALUES

CROSS-REFERENCE TO RELATED APPLICATIONS

The present application claims the benefit of the filing date of U.S. Provisional Application Ser. No. 63/158,295 filed Mar. 8, 2021, the entire teachings of which are hereby incorporated herein by reference.

TECHNICAL FIELD

The following disclosure relates generally to generation of cryptographic values (e.g., random numbers) that can be utilized in authentication and/or validation schemes implemented by computer systems and networks of computer systems.

BACKGROUND

It is known that equipment with security vulnerabilities can be exploited by malicious actors in so-called "cyberattacks", resulting in loss to the individuals, companies and/or institutions using the equipment. For example, when such equipment is introduced into supply chains for defense, public safety, critical infrastructure, or other regulated markets potential attacks on the equipment by malicious actors pose significant threats to the confidentiality, availability, and integrity of data generated, stored, or transmitted from the impacted equipment.

In an effort to thwart cyberattacks, cryptographic keys have been used to authenticate and authorize users of equipment and also to facilitate encryption and decryption of secure information. A cryptographic key is a string of bits used by a cryptographic algorithm to transform plain text into cipher text or vice versa. In some configurations, the cryptographic key is generated using a seed key. This cryptographic key is intended to remain private for ensuring security.

Also, research has uncovered chip manufacturing flaws that create a new paradigm of practical attacks that exploit physical software and firmware that lay beneath an operating system level. For example, several published methods have enabled researchers and attackers to acquire the raw signal directly from chips that generate cryptographic seed keys that create the entropy required to secure digital certificates and firmware stored within the system. Thus, at a manufacturer level, cybersecurity risks exist that can enable an attacker to introduce malicious code or decipher keys used to alter the functionality of the device and alter the operation of internet of things (IoT) devices and/or peripheral equipment.

To address these issues, code signing has been used to achieve security. Code signing uses cryptographic algorithms to produce code signatures that can only be generated by those who know a given password, also known as a secret key, but can be verified as genuine by anyone. When a signature is generated for a firmware binary, for example, it is uniquely tied to that exact firmware. Changing the firmware binary so much as one bit would produce a different signature.

Similarly, firmware signing is a method of proving a file was created by a trusted source and has not been tampered with. This is achieved by creating a signature for the file, e.g., a token which can be verified but not forged. Most firmware is either encrypted or bound to a cryptographic key that is embedded on the device.

Security thus depends, to a great extent, on cryptographic algorithms. A variety of cryptographic algorithms are known. Each algorithm produces an associated entropy in the associated data. Entropy, in cyber security, is a measure of the randomness or diversity of a data-generating function. Data with full entropy is completely random and no meaningful patterns can be found.

As computational power available to malicious actors for deciphering cryptographic keys and data generated by cryptographic algorithms increases, the relative entropy that is used for generation of keys, seed keys, code signatures, tokens, etc., must also increase to maintain security. With the onset of quantum cryptography and adversarial threats to modern cybersecurity, new methods must be introduced to avoid malicious attacks.

There exists a need to improve cryptographic key generation to avoid the potential for attacks to decipher keys, seed keys, code signatures, tokens, etc., and potentially alter the functionality of a device and compromise sensitive data.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

As discussed above, cryptographic keys, seed keys, code signatures, tokens, etc., can be deciphered or otherwise comprised which can lead to malicious actors disabling/bricking devices, snooping on end users or otherwise comprising privacy and security, and introducing latent problems that may be timed to disable or disrupt operation of a computer device.

Consider the following example scenario that highlights one route for comprising cryptographic keys. When computer systems are started, system functions are loaded from the Binary Input Output System (BIOS). In computing, BIOS is firmware used to perform hardware initialization during the booting process, and to provide runtime services for operating systems and programs. The BIOS firmware generally comes pre-installed on a system board, and it is the first software to run when the computing system is powered on. During the critical boot phase, a computer has a high degree of entropy as it loads information into memory to include drivers, bus interfaces and calls to initiate various processor calls and device actuation. However, after the primary boot process takes place, the entropy becomes relatively low.

The boot phase of a computing system is thus a time when the system is vulnerable to attacks. For example, using today's embedded systems dealing with cryptographic primitives (seeds) and secrets involved in cryptographic operations, side-channel analysis (SCA) attacks are considered as one of the most serious methods to discover seed keys and cryptographic primitives used to secure systems from attack. Differential power analysis (DPA) attacks later extended to correlation power Analysis (CPA) attacks and have also been proven to be powerful tools to extract secrets from cryptographic devices when the attacker has physical access to the target. Along the same line, compared to that using power consumption, measuring the electromagnetic emanation (EM) of the device can lead to stronger attacks since EM signals can be localized and are usually less influenced by other irrelevant parts of the circuit.

Currently, vulnerabilities exist that compromise the authentication process between firmware and hardware giving attackers full access to the system including encryption keys. Once a key or seed key has been discovered, it is then decrypt or decipher the data. Researchers or attackers can also then inject new code and forge the signed code. Such attacks are virtually impossible for a system administrator to detect but will allow an attacker to not only decrypt or exfiltrate information, but also have other computers pose as the compromised device by spoofing hardware IDs.

These attacks can run as malware and spyware operating at the hardware level, which is invisible to anti-virus software. It was once thought that such an attack would require physical access to the device. However, emerging research has concluded that forged and signed firmware updates can be embedded into devices that can provide the same privileges as if the attacker had physical access to the device.

Further, industry-standard methods of managing cryptographic keys have become increasingly vulnerable to attack. For example, one legacy method of generating a cryptographic key is to use a Trusted Platform Module, or TPM. One of the TPM's greatest strengths is its ability to generate a cryptographic key and protect its secret within a hardware boundary. The key generator is based on the TPM's own random number generator, and by design does not rely on external sources of randomness.

As miniaturization of processors and chips evolved, many industries moved to TPM's. One approach dubbed the tactics, techniques, and procedures (TTP's) captured the seed key by "listening" for when the system began performing repetitive operations (XoRing) and infer the data being processed on the secure chip. The researchers were then able to extract the private keys used by the digital signature schemes based on elliptic curve algorithms.

This digital signature scheme is used in many of today's cryptographically secured operations, such as when establishing TLS connections, signing digital certificates, and authorizing logins. This type of attack is expected to be fully weaponizable when quantum cryptography is introduced at an academic or nation-state level.

Present iterations of Pseudo Random Number Generators (PRNGs) use system collected methods including CPU timing, network time protocols, and memory bit locations to create randomness and ability to use high entropy sources to seed data. However, these entropy sources continue to be a weak point in PRNGs, and given enough time and increased computation resources, will be fertile ground for future attacks.

The present disclosure is generally directed to a system that generates cryptographic values, e.g., keys, seed keys, code signatures, tokens, etc. Aspects and features of the present disclosure are applicable in a wide variety of applications and scenarios that seek to increase security of generated keys/secrets/certificates.

One aspect of the present disclosure includes a system for generating cryptographic values. The system includes an imaging assembly, such as a computed spectral tomography image assembly. The imaging assembly may include a housing and a base disposed within the housing. The base may provide a mount to couple to a target member, such as a target member in the form of organic material such as a pearl. As used herein "organic material" refers to material that is derived from living matter. A pearl is thus an organic material, as used herein, since it is derived from a living oyster. An identification circuit, such as a Radio Frequency Identification (RFID) chip, may be configured to uniquely identify the target member, e.g., a pearl, and coupled to the target member.

At least one image sensor of the imaging assembly may be aligned with the mount of the base such that a field of view of the at least one image sensor includes at least a portion of the target member when the target member supported by the mount. The at least one image sensor can be configured to output photoluminescent image data based on the target member coupled to the base. The imaging assembly may also include a dual energy acquisition sensor, e.g., using a photon counter detector, to create the output image data A controller may then receive the output image data and generate a cryptographic value, such as a decimal value, in response to the output image data combining the RFID chip and the pearl.

Figure 1:
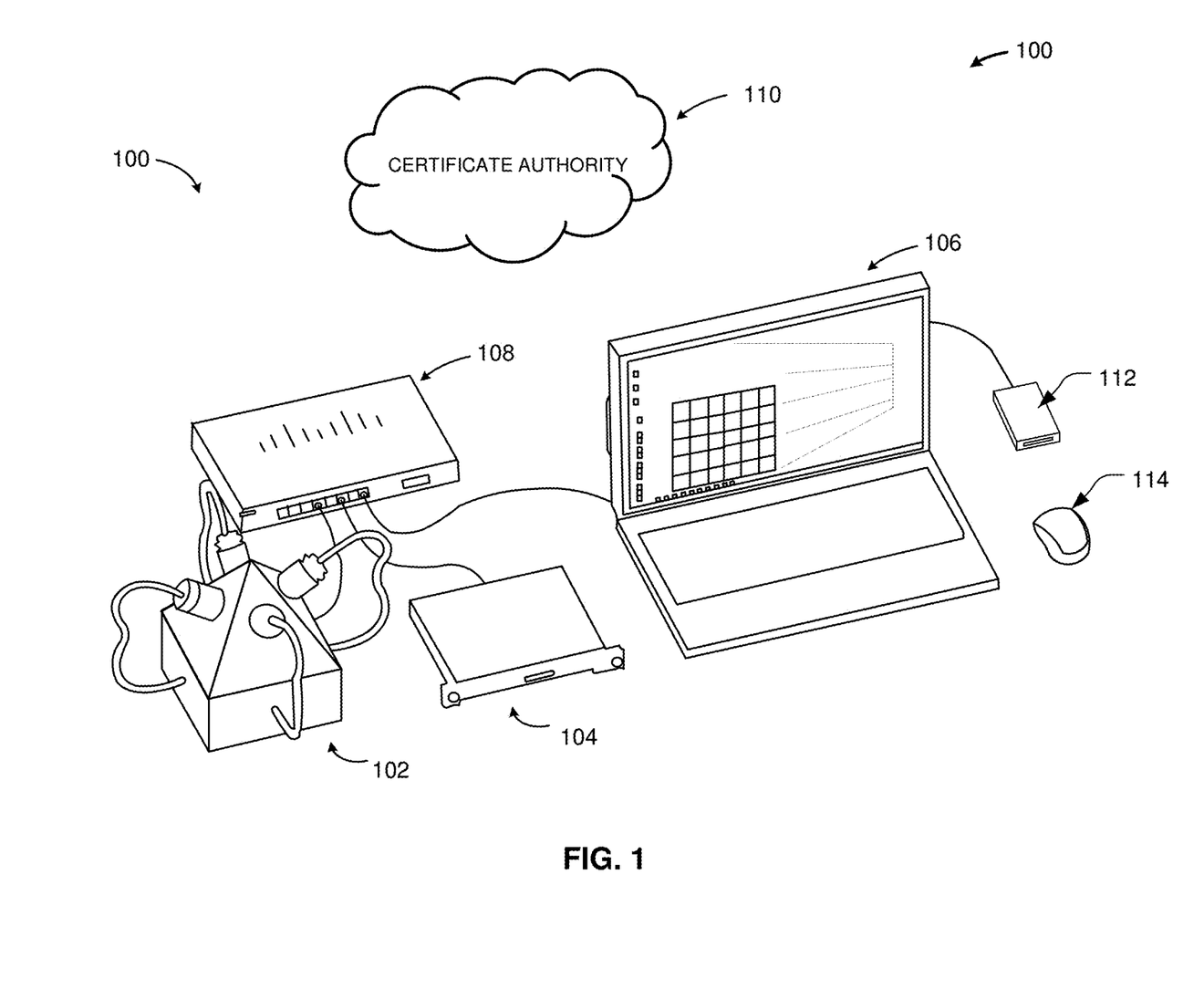
FIG. 1 depicts an example system for generation of cryptographic values consistent with aspects of the present disclosure.

FIG. 1 shows an example system 100 for generating cryptographic values consistent with aspects of the present disclosure. The generated cryptographic values may be high-entropy cryptographic values. As used herein a "high-entropy" cryptographic values have a key strength that exceeds traditional seed key strengths generated by known Rivest-Shamir-Adleman (RSA) algorithms RSA 128, RSA 256 or RSA 2048. The cryptographic values may be output as numerical values. Thus, the example system 100 may also be referred to herein as a Pseudo Random Number Generator (PRNG) system.

As shown, the system 100 preferably includes an imaging assembly 102, a hardware security module 104, a computer device 106, an Ethernet switch 108, a certificate authority 110, a card reader 112 and a mouse 114. The imaging assembly 102 may include a housing and at least one image sensor for imaging of a target member 208 (FIGS. 2 and 3), as is discussed in further detail below. The imaging assembly 102 may be coupled to communicate image output data representative of an image of the target member to the hardware security module 104 and the computer device 106 via a local area network provided by the Ethernet switch 108. However, this disclosure is not necessarily limited in this regard and the imaging assembly 102 can communicate with components of the system 100 via other wired, or wireless protocols such as Bluetooth low energy (BLE).

Figure 5:
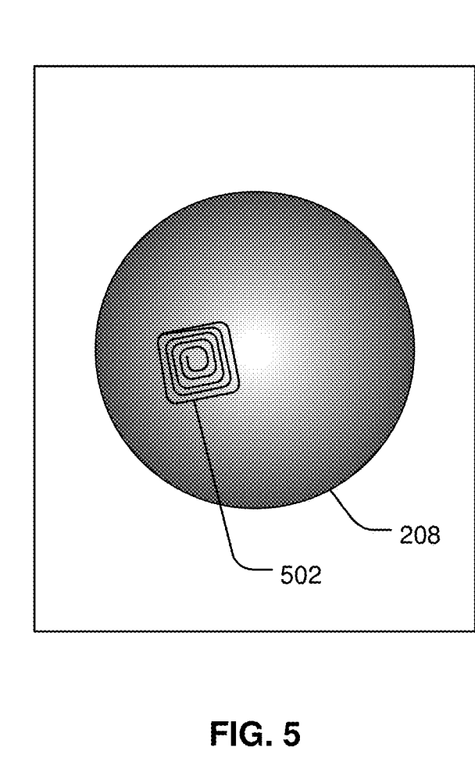
FIG. 5 shows organic material target member in the form of a pearl suitable for use by methods and systems of the present disclosure.
Figure 6:
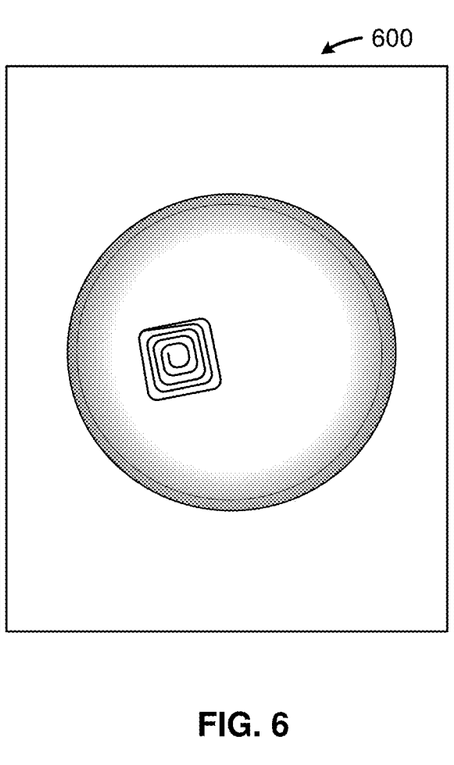
FIG. 6 shows an example image of a first portion of the of the target member of FIG. 5 captured by an imaging assembly consistent with aspects of the present disclosure.
Figure 7:
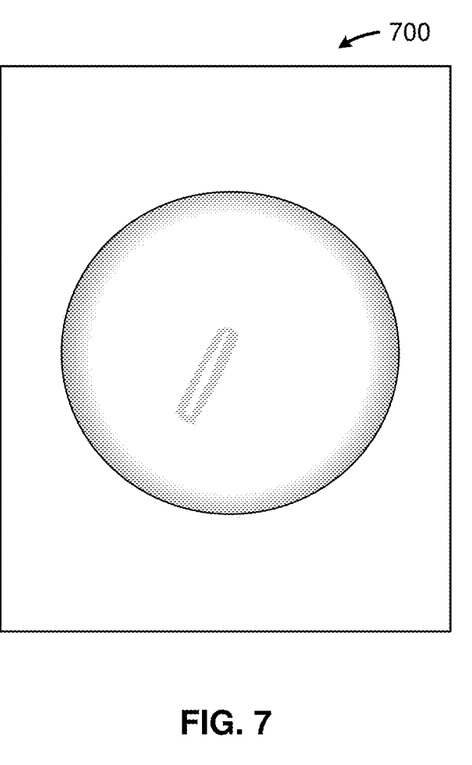
FIG. 7 shows another example image of a second portion of the target member of FIG. 5 captured by an imaging assembly consistent with aspects of the present disclosure.

The imaging assembly 102 is preferably configured to output image data to the hardware security module 104 and/or the computer device 106. The output image data may be derived from a computed spectral tomography image data and values derived from images of the target member 208 (FIGS. 2 and 3) taken from different image sensors 210. FIG. 6, for example, is an image 600 of a first portion of the target member 208 shown in FIG. 5 taken by the imaging assembly 102 and FIG. 7, for example, is an image 700 of a second portion of the target member 208 shown in FIG. 5 taken by the imaging assembly 102. The output image data derived from the images is preferably based on a spectrograph system. One such approach includes generating output image data via real-time X-ray (RTX) microradiograph using Raman Spectroscopy (RS). RS is a non-destructive chemical analysis technique which provides detailed information about chemical structure, phase and polymorphy, crystallinity and molecular interactions, and is based upon the interaction of light with the chemical bonds within a material.

The hardware security module 104 may be implemented as an integrated unit comprising a network switch, gateway sever, and other associated components that implement end-to-end encryption, although other types and configurations of security modules are within the scope of this disclosure. The hardware security module 104 further may include at least one controller such as a computer processor (e.g., x86, x64), application-specific integrated circuit (ASIC), field programmable gate array (FPGA), or other suitable circuit/chip.

The computer device 106 may also be configured with at least one computer processor (e.g., x86, x64), application-specific integrated circuit (ASIC), field programmable gate array (FPGA), or other suitable circuit/chip. The computer device 106, and more specifically an application executed on the computer device 106, can be used to cause the imaging assembly 102 to capture image data from a target member and output the captured image data. The computer device 106 may then receive the captured image data output by the imaging assembly 102. Alternatively, or in addition, the imaging assembly 102 may output a cryptographic value based on the image data such as a decimal number. Thus, the computer device 106 may receive captured image data or the cryptographic value from the imaging assembly 102, or both. The computer device 106 can then generate a certificate signing request (CSR) which may be a permutation of the output image data derived from the target member, e.g., organic material, and a computer-based seed key (e.g., provided by the computer device 106 or other suitable source) that provides a virtually unguessable entropy source by an attacker.

The hardware security module 104 and the imaging assembly 102 thus can "scan" the target member, e.g., organic material/element, and generate output image data. The output image data is a digital representation of an image of the target member. The output image data may be used to generate a certificate signing request. In some embodiments, a split key algorithm is used which encompasses the image of the target (i.e., a signature of the target) and the computer signature to minimize or otherwise reduce the guessability of the seed key.

Figure 4:
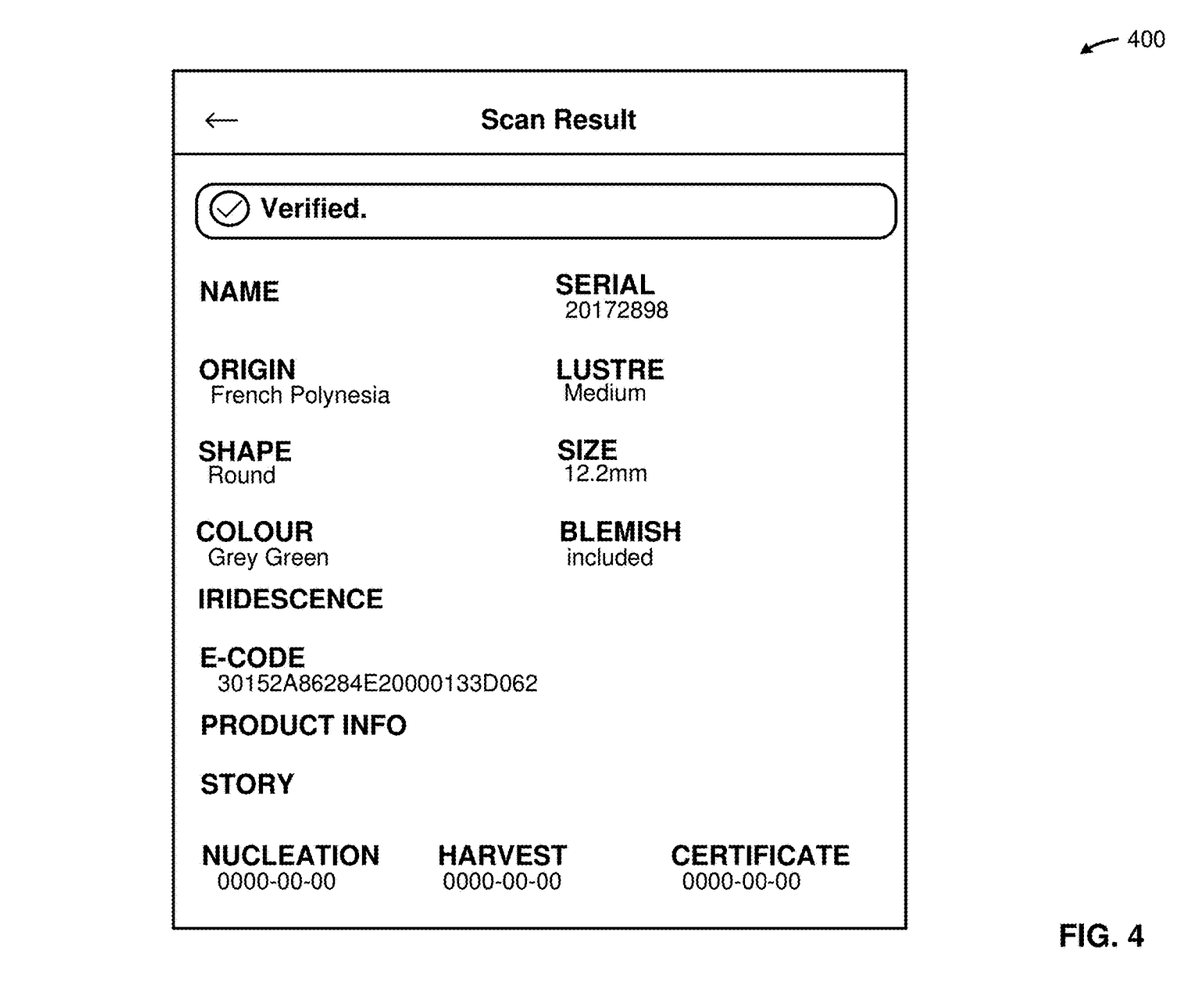
FIG. 4 shows an example scan result after scanning of a target member by an imaging assembly consistent with aspects of the present disclosure.

One example scan result 400, which may be displayed on a display of the computer device 106, is shown in FIG. 4. Regarding FIG. 4, the implementation the system used to capture the signature of the target member preferably begins with the assignment of a serial number to the target, of which the current reference of FIG. 4 is a French Polynesian Pearl. The serial number preferably tags the unique device ID like a Media Access Control (MAC) address of network connected device. The sensor preferably permutates output image data associated with the target to include digital representation of luster, shape, size, color, blemish, and/or iridescence into a unique value known as the E-Code. The E-code is preferably permutated into the certificate signing request by integrating the RFID read signature value that sent to the certificate authority for signing. When the signed certificate is imported into the certificate store of the device, the E-code is preferably derived as the alternate subject and verified by a radio frequency identification (RFID) reader that reads the RFID chip on the target. The supply chain integrity is preferably maintained by the insertion of the RFID chip into or onto the target (e.g., the pearl in the example of FIG. 4) using epoxy to ensure that if the pearl was removed either the pearl would (a) be broken, or (b) not registered by the sensor for comparison off-center to prevent damage from drilling. Alternative methods for identifying the authenticity of the target (e.g., pearl) includes, for example, a smart phone app tied to an RFID reader so the certificate information can be retrieved to track the source of the target (i.e., nucleation, harvest, and certificate).

The computer device 106 may be configured to communicate with a certificate authority 110 via, for instance, a local or wide-area network as the Internet. In one example, the computer device 106 communicates with the certificate authority 110 via the Ethernet switch 108. The certificate authority 110 may comprise a federally trusted certificate authority which used Active Directory Federation Services (ADFS), although other certificate authorities are within the scope of this disclosure.

Figure 2:
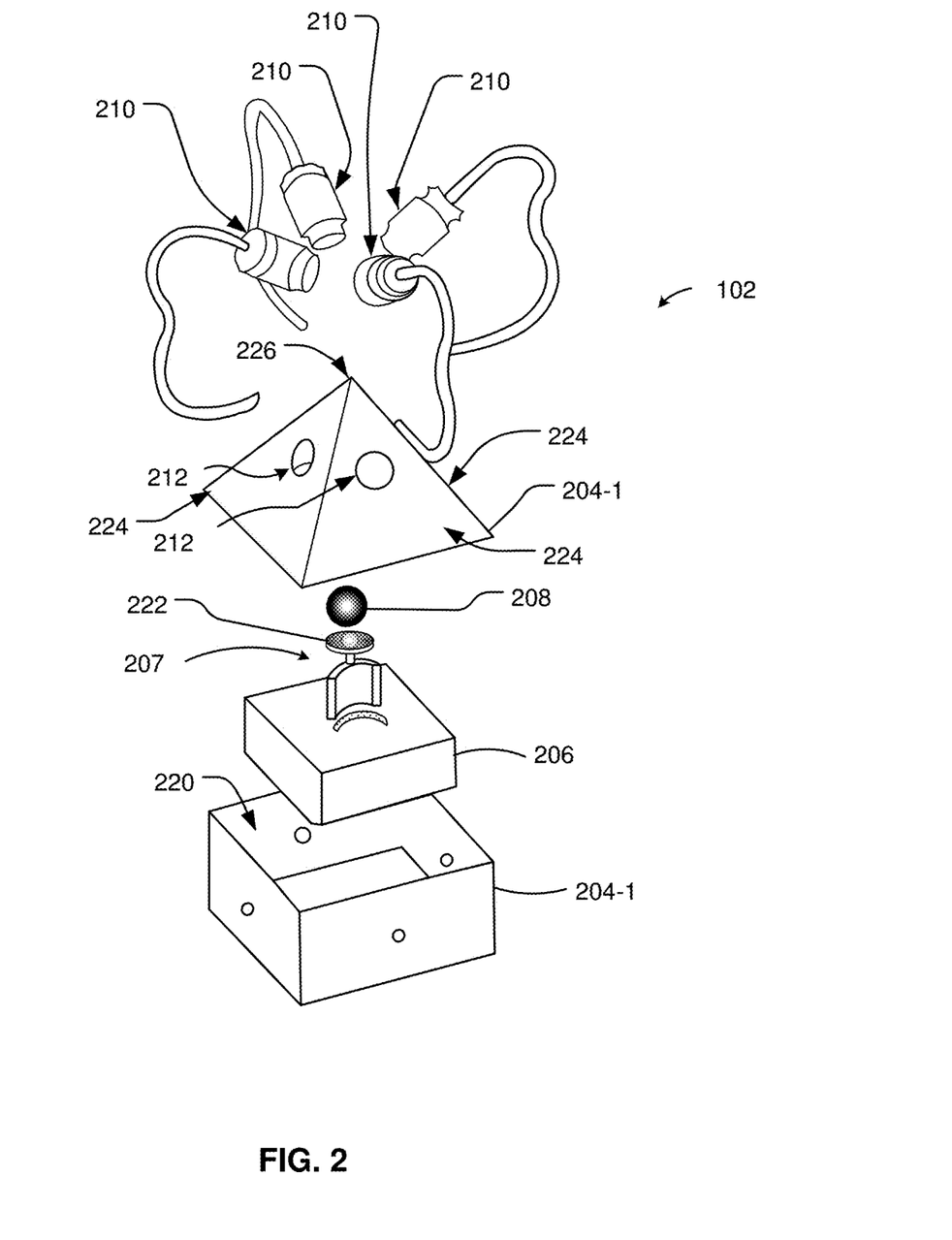
FIG. 2 shows an exploded view of the imaging assembly of the system of FIG. 1 in accordance with aspects of the present disclosure.
Figure 3:
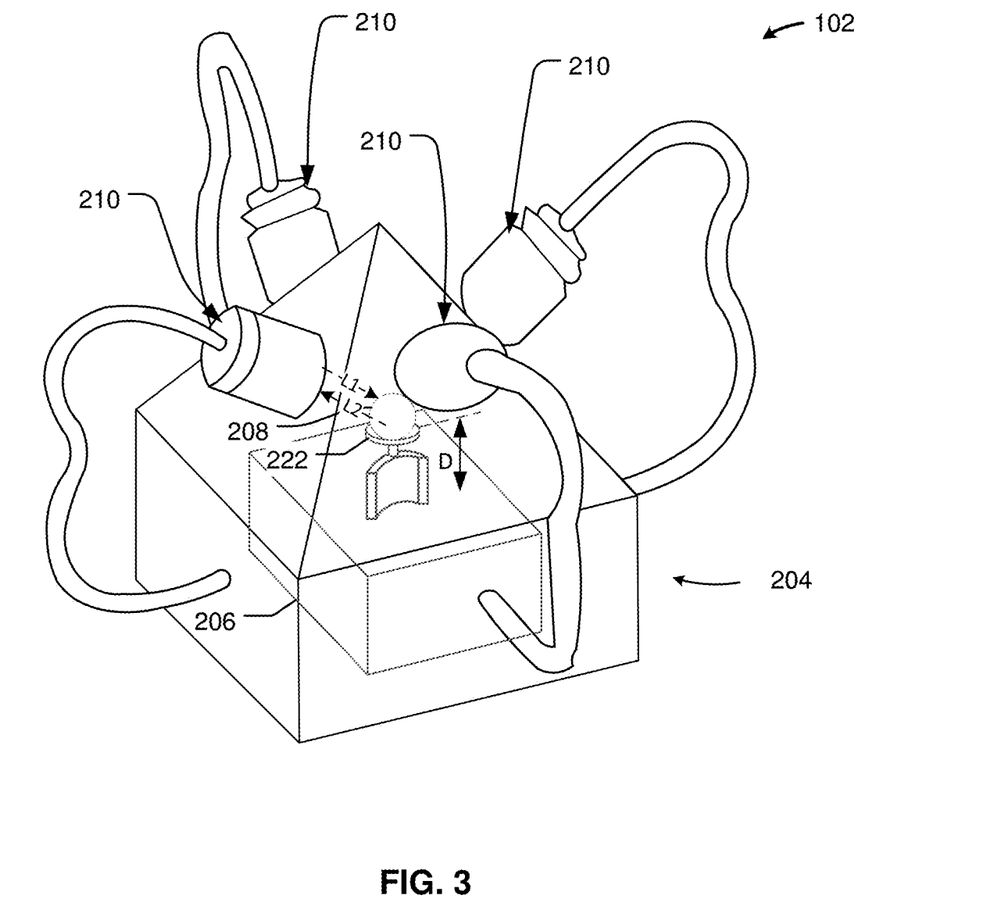
FIG. 3 shows an assembled view of the imaging assembly of the system of FIG. 2, with internal elements in ghost, in accordance with aspects of the present disclosure.

FIG. 2 shows an exploded view of imaging assembly 102 and FIG. 3 shows an assembled view of the imaging assembly 102, with internal elements in ghost, in accordance with aspects of the present disclosure. In the illustrated example embodiment, the imaging assembly 102 includes a housing shown collectively at 204, in FIG. 3, and individually as first and second housing portions 204-1, 204-2 in FIG. 2. The housing 204 includes a plurality of sidewalls that define a cavity 220. The housing 204 may be formed from a metal such as composite or fiber metal, although other material types are within the scope of this disclosure. The first and second housing portions 204-1, 204-2 may be configured to be removably coupled to each other. The cavity of the housing 204 may be defined by the first and/or second housing portions.

The illustrated imaging assembly 102 further includes a base 206. The base 206 can be formed of a material such as carbon fiber. The base 206 may have a rectangular shape, although other shapes and profiles are within the scope of this disclosure. The base 206 further provides a mount 207. The mount 207 may be formed integrally with the base 206 from a single piece of material or may be formed as a separate component. Likewise, the base 206 and the first housing portion 204-1 may also be integrally formed from a single, monolithic piece of material or from multiple pieces. In the illustrated embodiment, the base 206 and the second housing portion 204-1 are formed from multiple separate pieces. As further shown, the mount 207 may define a seat 222 to support the target member 208. The seat 222 of the mount 207 may have a concave profile to receive and support the target member 208. The mount 207 extends from the base 206 to a predefined distance D (FIG. 3) above the top of the base 206 in the range of 44-70 mm, although other distances are within the scope of this disclosure.

The target member 208 may be formed of an organic material, and in some embodiments, an organic material comprised of crystalline structures. In some embodiments, the organic material can include calcium carbonite, generally referred to as pearl. However, target members 208 formed from other types of organic and inorganic materials and/or combinations thereof are within the scope of this disclosure. For example, target members 208 useful in a system or method consistent with the present disclosure may include crystals, precious gems, and other materials that can be used to render/generate output image data. In addition, the target member 208 may have a spherical shape, such as shown, although other shapes and profiles are within the scope of this disclosure. In one example, the target member 208 includes an identification circuit 502 (FIG. 5) that uniquely identifies the target member. The identification circuit is preferably coupled to the target member and may be disposed on or in the target member 208. The identification circuit may be implemented as, for example, a radio frequency identification (RFID) circuit.

The second housing portion 204-2 can include a plurality of sloping sidewalls 224 that extend to an apex 226 and form a substantially pyramid shape. The second housing portion 204-2 preferably includes at least one aperture, and in some embodiments a plurality of apertures 212, which are in communication with the cavity of the housing 204. In the example of FIG. 2, an aperture 212 is formed in each of the sloping sidewalls and is disposed at a predetermined position relative to the base 206, and more specifically, the target member 208 supported on the base 206 via the mount 207.

The imaging assembly 102 further includes at least one image sensor 210. In some embodiments. the at least one image sensor 210 may be implemented as a photovoltaic image sensor that includes an emitter to emit light L1 (FIG. 3) having one or more wavelengths toward the target member 208, and a receiver/photosensitive member to detect light L2 (FIG. 3) having one or more of the emitted wavelengths reflected/refracted by the target member 208. The at least one image sensor 210 may be configured to sense, for example, 65,000 different wavelengths that are refracted/reflected from the target member 208. The imaging assembly 102 may further include a signal amplifier and/or filter circuitry to filter and amplify image data.

Any number of image sensors 210 may be provided in an imaging assembly consistent with the present disclosure. The illustrated example embodiment 102 includes four image sensors 210 In this example, the imaging assembly 102 can output image data represents that includes a panoramic image of the target member 208 (e.g., substantially 360 degrees about the target member 208). Each image sensor of the plurality of image sensors 210 is configured to be coupled to the second housing portion 204-2 and aligned with a corresponding aperture of the plurality of apertures 212. Thus, each image sensor of the plurality of image sensors 210 can include a field of view that includes at least a portion of the target member 208 disposed within the cavity of the housing 204. Each field of view of the plurality of image sensors 210 may be different/non-overlapping, or at least partially overlapping depending on a desired configuration. The plurality of image sensors 210 preferably remain coupled to the second housing portion 204-2 when the same is decoupled from the first housing portion 204-1.

In the illustrated example embodiment, each of the at least four image sensors 210 has a field of view which is angled and aligned with the target member 208. Each of the at least four image sensors 210 emit a plurality of wavelengths L1 along a light path that intersects with surfaces of the target member 208. The at least four image sensors then receive wavelengths L2 (e.g., 65,000 different wavelengths/colors), e.g., via photosensitive elements, which are reflected/refracted by the surfaces defining the target member 208. The received wavelengths may then be converted to associated image data by photosensitive members in the image sensors 210. The imaging assembly 102 may convert and/or assemble the image data to provide output image data to the computer device 106. The output image data is representative of the image of the target taken by the image sensors. The computer device 106 may generate a cryptographic value in response to the output image data, for example, for purposes of certificate signing as disclosed herein. Alternatively, or in addition, the imaging assembly 102 may output a cryptographic value to the computer device 106 in the form a numerical value representative of the image data.

In any such cases, the cryptographic value may be utilized in combination with the Hardware Security Module 104 and computer device 106, for example, to generate a certificate signing request (CSR). The certificate signing request may then be signed by the certificate authority 110 and ingested into the trusted certificate store of the computer device 106.

When a certificate is needed by a relying party, e.g., for purposes of validating a certificate, a user can have an imaging assembly 102 coupled to a computer device such as smartphone or laptop. Preferably, a challenge will be made requiring the smart card, PIN, and the organic material to establish the asymmetric key encryption handshake.

Methods and systems consistent with the present disclosure can include an imaging assembly that functions as a random number generator sensor that generates a seed key (based on a cryptographic value) used in certificate signing requests that can be integrated into network connected devices and peripherals using target material, such as an organic material. The methods and systems can further include using multi-factor login to Windows Active Directory Architecture based on the generated seed key.

The methods and systems can further include Network and Server Authentication implementations used to authenticate users using a smart card and Microsoft Cryptographic Application Services embedded into a Windows 10 based operating platform.

The methods and systems further include supporting user provisioning of authentication, encryption, and digital signing certifications The methods and systems can further include role and realm configuration (policies and group membership and services).

The methods and systems can further include providing generation and preparation of user credentials (certificates) to be exported to external cards, credentials, and systems.

The methods and systems can further include supporting the presentation of breeder documents and identification forms.

The methods and systems can further include enabling the scanning and storage of breeder documents into secure offline repository.

The methods and systems can further include enabling the creation of a user account in the Active Directory.

The methods and systems can further include capturing the fingerprint, photo, and other relevant personal biographical data to be use in the system.

The methods and systems can further include supporting the use of Personal Identity Card (smartcard), readable in recognizable format with other PIV capable platforms, systems, and products.

The methods and systems can further include supporting the arrangement of credential inventory and data according to PIV-I and FIPS requirements and policies.

The methods and systems can further include inserting a smartcard into a laptop or computer for multifactor login.

The methods and systems can further include enabling login of user without username/password combination using smartcard and the smart card reader 112 (pin requirement only).

The methods and systems can further include enabling login of user without username password combinations using smartcard (pin & biometric).

The methods and systems can further include supporting the generation of digital certificates to be exported to logical network edge devices (PKCS 10 Standards).

The methods and systems can further include supporting the generation of digital certificates to be exported to logical internal infrastructure components (PKCS 10) Standards The methods and systems can further include supporting trust relationships and bindings between network edge devices and internal infrastructure components for personal entities The methods and systems can further include supporting the trust relationships and bindings between network edge devices and internal infrastructure components for non-personal entities The methods and systems can further include supporting the authorization and revocation of authorizations from network edge and internal infrastructure non-personal entity components.

The methods and systems can further include 1 supporting cryptographic database authentication, stored procedures, application interrogation, metadata and integration structures, logging, audit, alert and triggers, and ODBC interfaces.

The methods and systems can further include supporting database interfaces using lightweight Directory Access Protocol (LDAP)

The methods and systems can further include supporting database replication parameters and schedules.

The methods and systems can further include supporting metadata schemes and architectures using cryptographic components The methods and systems can further include supporting Protected Service Accounts (PSA's)

The methods and systems can further include supporting edge personal and non-personal entity protection using Simple Certificate Enrollment Protocol (SCEP)

The methods and systems can further include supporting remote access using one-time password (OTP) for multi-factor authentication for mobile devices.

The methods and systems can further include supporting Firewall and malware screening The methods and systems can further include supporting Secure Sockets Layer (SSL) Interfaces for Application-level interfaces.

The methods and systems can further include supporting code signing and code certificate generation The methods and systems can further include supporting Integrated Directory services using Microsoft Active Directory Federation Services for multi-domain trust relationships, and directory integration using multi-domain administration models, resource domains, and user domains.

The methods and systems can further include supporting domain integration and multi-directory services architectures.

The methods and systems can further include supporting transitive trust relationships using PKI and directory services.

The methods and systems can further include supporting group and user policy objects and rights administration.

The methods and systems can further include supporting de-provisioning and revocation of trust models and effect on directory architectures.

The methods and systems can further include supporting connectivity requirements to the US Federal PKI Bridge Authority The methods and systems can further include supporting Use of digital certificate importing into physical access control systems as per OMB M-11-11, FICAM, CMMC mandates and NIST guidelines.

The methods and systems can further include Mapping to CMMC-Certification Requirements According to one aspect of the disclosure, there is thus provided a system for generating a cryptographic value, the system including: an imaging assembly, the imaging assembly including: a housing, a base disposed in the housing, a mount extending from the base and configured to support a target member, and at least one image sensor aligned with the mount such that a field of view of the at least one image sensor includes at least a portion of the target member when the target member is supported by the mount. The at least one image sensor is configured to receive light from the target member and provide output image data in response to the light from the target member. The system further includes a controller to receive the output image data and generate a cryptographic value in response to the output image data.

According to another aspect of the disclosure there is provided a method for generating a cryptographic value including: using an imaging assembly to generate image data in response to light received from a target member; and generating a cryptographic value in response to the image data.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

It will be appreciated by those skilled in the art that any block diagrams herein represent conceptual views of illustrative circuitry embodying the principles of the disclosure.

Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein in regard to electrical, electromagnetic or optical connections refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

What is claimed is:

1. A system for generating a cryptographic value, the system comprising:
   an imaging assembly, the imaging assembly comprising:
      a pearl,
      a radio frequency identification (RFID) circuit coupled to the pearl, the RFID circuit establishing a RFID signature associated with the pearl,
      a housing,
      a base disposed in the housing,
      a mount extending upwardly from the base and defining a seat configured to support the pearl, and
      at least one image sensor aligned with the mount such that a field of view of the at least one image sensor includes at least a portion of the pearl when the pearl is supported by the mount,
      wherein the at least one image sensor is configured to receive light from the pearl and provide output image data in response to the light from the pearl, the output image data being representative of at least one feature of the pearl; and
   a controller to receive the output image data, permute the output image data to provide permuted output image data, and permute the permuted output image data with the RFID signature to generate a certificate signing request.

2. The system of claim 1, wherein the mount is concave to receive and support the pearl.

3. The system of claim 1, wherein the image sensor includes an emitter to emit light toward the pearl and a photosensitive detector to detect the light reflected and/or refracted from the pearl.

4. The system of claim 1, wherein the at least one image sensor is a plurality of image sensors.

5. The system of claim 4, wherein each image sensor of the plurality of image sensors is disposed about the mount.

6. The system of claim 5, wherein each image sensor of the plurality of image sensors is disposed about the mount such that the output image data the plurality of image sensors represents a 360-degree view of the pearl.

7. The system of claim 5, wherein the housing includes a plurality of apertures, each aperture of the plurality of apertures configured to align a corresponding image sensor of the plurality of image sensors with the mount.

8. The system of claim 1, wherein the housing includes a first housing portion that defines a cavity to receive the base and a second housing portion to couple to the at least one image sensor.

9. The system of claim 8, wherein the second housing portion includes a plurality of sloping sidewalls that extend to an apex.

10. The system of claim 9, wherein at least one sloping sidewall of the plurality of sloping sidewalls includes an aperture to couple to the at least one image sensor.

11. The system of claim 10, wherein the at least one image sensor comprises a plurality of image sensors, and wherein each sloping sidewall of the plurality of sloping sidewalls includes an aperture to couple to a corresponding image sensor of the plurality of image sensors.

12. The system of claim 11, wherein the plurality of image sensors remain coupled to the second housing portion when the second housing portion is decoupled from the first housing portion.

13. The system of claim 1, wherein the RFID circuit is disposed in the pearl.

14. The system of claim 1,
wherein the housing comprises:
a first housing portion defining a cavity, and
a second housing portion removably coupled to the first housing portion and disposed on top of the first housing portion,
the second housing portion including a plurality of sloping sidewalls that extend to an apex, at least one of said sloping side walls including an aperture;
wherein the base is disposed in the cavity,
wherein the mount extends upwardly from a top surface of the base, and
wherein the at least one image sensor is coupled with the aperture.

15. A system for generating output image data for, the system comprising:
a pearl;
a radio frequency identification (RFID) circuit coupled to the pearl;
a housing, the housing comprising:
a first housing portion defining a cavity, and
a second housing portion removably coupled to the first housing portion and disposed on top of the first housing portion,
the second housing portion including a plurality of sloping sidewalls that extend to an apex, at least one of said sloping side walls including an aperture;
a base disposed in the cavity;
a mount extending upwardly from a top surface the base and defining a concave seat, wherein the pearl is supported on the seat; and
at least one image sensor coupled with the aperture and aligned with the mount such that a field of view of the at least one image sensor includes at least a portion of the pearl supported on the seat,
wherein the at least one image sensor is configured to receive light from the pearl and provide the output image data in response to the light from the pearl.

16. The system of claim 15, wherein the RFID circuit establishes a RFID signature associated with the pearl and the output image data is representative of at least one feature of the pearl, the system further comprising a controller to receive the output image data, permute the output image data to provide permuted output image data, and permute the permuted output image data with the RFID signature to generate a certificate signing request.

* * * * *